United States Patent
Gunasekara et al.

(10) Patent No.: US 9,882,851 B2
(45) Date of Patent: Jan. 30, 2018

(54) USER-FEEDBACK-BASED TENANT-LEVEL MESSAGE FILTERING

(71) Applicant: Microsoft Technology Licensing, LLC, Redmond, WA (US)

(72) Inventors: Atapattuge D. Samith Gunasekara, Sammamish, WA (US); Bruce Taimana, Bellevue, WA (US); Gregory Gourevitch, Redmond, WA (US); Ravi Kiran Reddy Poluri, Sammamish, WA (US); Krishnan Rangarajan, Redmond, WA (US); Una Sai Prasad Patro, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 14/754,132

(22) Filed: Jun. 29, 2015

(65) Prior Publication Data
US 2016/0380936 A1 Dec. 29, 2016

(51) Int. Cl.
*G06F 15/16* (2006.01)
*H04L 12/58* (2006.01)
*G06Q 10/10* (2012.01)

(52) U.S. Cl.
CPC ............ *H04L 51/12* (2013.01); *G06Q 10/107* (2013.01)

(58) Field of Classification Search
USPC ........................................................ 709/206
See application file for complete search history.

(56) References Cited

U.S. PATENT DOCUMENTS

| | | |
|---|---|---|
| 6,453,327 B1 | 9/2002 | Nielsen |
| 7,320,020 B2 | 1/2008 | Chadwick et al. |
| 7,433,924 B2 | 10/2008 | Malcolm |
| 7,487,217 B2 | 2/2009 | Buckingham et al. |
| 7,689,652 B2 | 3/2010 | Mishra et al. |
| 7,941,490 B1 | 5/2011 | Cowings |
| 8,108,323 B2 | 1/2012 | Weinberger et al. |
| 8,959,159 B2 | 2/2015 | Vitaldevara et al. |

(Continued)

OTHER PUBLICATIONS

"Second Written Opinion Issued in PCT Application No. PCT/US2016/039696", dated Mar. 8, 2017, 8 Pages.

(Continued)

*Primary Examiner* — Hee Soo Kim
(74) *Attorney, Agent, or Firm* — Workman Nydegger

(57) ABSTRACT

Embodiments maintain filtering criteria for classifying electronic messages in a multi-tenant environment, including maintaining global filtering criteria for all tenants, as well as tenant-level filtering criteria for each tenant. For each tenant, feedback regarding a messaging campaign is identified. When the messaging campaign has not been categorized, and the feedback signals the messaging campaign as undesirable, the tenant-level filtering criteria for the tenant is updated to signal the messaging campaign as undesirable. When the messaging campaign has previously been categorized as undesirable, and the feedback signals the messaging campaign as desirable, the tenant-level filtering criteria for the tenant is updated to signal the messaging campaign as desirable. A reputation score for each tenant is also calculated. The global filtering criteria is updated to signal desirability of the messaging campaign when a threshold number of tenants, each having a threshold reputation score, reach a consensus regarding desirability of the messaging campaign.

20 Claims, 5 Drawing Sheets

(56) References Cited

U.S. PATENT DOCUMENTS

2010/0153394 A1  6/2010 Wood
2012/0131107 A1  5/2012 Yost
2012/0215853 A1  8/2012 Sundaram et al.
2013/0117397 A1  5/2013 Chasin et al.
2014/0229407 A1  8/2014 White

OTHER PUBLICATIONS

International Search Report and Written Opinion for PCT/US2016/039696 dated Sep. 5, 2016.
Bajaj, et al., "A Case Study of User-Level Spam Filtering", In Proceedings of the Twelfth Australasian Information Security Conference, vol. 149, Jan. 20, 2014, pp. 67-75.
"Phishing and Spam", Retrieved on: Jun. 2, 2015 Available at: http://www.itservices.qut.edu.au/student/information-security/spam.jsp.
International Preliminary Report on Patentability issued in PCT Patent Application No. PCT/US2016/039696 dated Jun. 13, 2017.

USER-FEEDBACK-BASED TENANT-LEVEL MESSAGE FILTERING

BACKGROUND

Various forms of electronic messaging (e.g., e-mail, SMS, MMS, instant messaging, etc.) have vastly enhanced the speed and efficiency with which we communicate. As such, electronic messaging services are now a central feature of most online services. Unfortunately, the pervasiveness, ease of use, and low per-message cost of sending electronic messaging leads to generation of a great quantity of undesirable messages (SPAM) from spammers or other senders, such as unsolicited marketing messages, mailing/distribution list messages, messages distributing malware, messages attempting to trick the recipient in some way (e.g., to divulge personal information, to visit an unintended URL, to engage in a fraudulent business transaction), etc.

To enhance the experience of their users, service providers fight a constant battle with spammers to reduce the amount of undesirable messages that reach users. In general, when an electronic message is received for a user, a service provider must decide whether that message is desirable or undesirable for that user. This is typically done with filters that contain rules and/or blacklists. For example, filters may identify undesirable messages based on an analysis of message content including any attachments (e.g., using keywords, URL lists, hashes) and envelope information including the sender's IP address. Filters must be constantly updated as spammers alter message content, originating IP address, etc. to overcome existing filter rules and/or blacklists.

In existing environments, filtering is typically accomplished through use of global filtering criteria (i.e., rules/lists applying to all users in the system) and user-specific filtering criteria (i.e., rules/lists applying to each user individually). In these environments, as individual users provide feedback signals for electronic messages (e.g., as being desirable or undesirable) that user's individual filtering criteria is updated accordingly. Through a feedback mechanism, the global filtering criteria may later be updated based on how individual users have classified those messages (e.g., to classify those messages a desirable or undesirable).

While this feedback mechanism is helpful, it does have some limitations. For example, since it may take some time for a sufficient number of users to classify a category of messages, it may also take an unacceptably long amount of time update the global filtering criteria to allow or disallow these messages. In addition, since different users may have different views on what constitutes desirable vs. undesirable messages it can be very difficult to determine how to update the global filtering criteria.

In addition, spammers have leveraged these feedback mechanisms to game global filters. For example, a spammer may obtain accounts with a service provider, and send undesirable messages to those accounts. Then, using those accounts, the spammer may signal that those messages are desirable messages. In this way, spammers may be able to affect global filters to classify their undesirable messages as desirable, enabling those messages to reach other users of the service.

Recently, multi-tenant environments have been gaining in popularity. In a multi-tenant environment, a service provider provides or hosts services for tenants (e.g., businesses) having a plurality of users (e.g., employee accounts). The addition of multi-tenant environments has provided spammers additional tools for gaming and otherwise bypassing global filtering criteria. For example, spammers may obtain tenant accounts with a service provider, and use those tenant accounts to send undesirable messages. Since the undesirable messages originate from an IP address of the service provider, and come from what may look like a legitimate customer, it can be difficult for a service provider to appropriately classify those messages.

BRIEF SUMMARY

At least some embodiments described herein are directed to maintaining filtering criteria for classifying electronic messages in a multi-tenant environment, including introducing tenant-level filtering criteria. In general, tenant-level filtering criteria may be updated based on user-level feedback from within the tenant, and global filtering criteria may be updated based on tenant-level filtering criteria from a plurality of tenants. The introduction of tenant-level filtering criteria provides for responsive and highly customized filtering for individual tenants, based on user feedback from within the tenant. In addition, updating global filtering criteria based on tenant-level filtering criteria from a plurality of tenants provides several unique mechanisms to isolate and/or identify spammers, and to prevent spammers from gaming global filtering criteria.

Embodiments may include methods, systems, and/or computer program products for maintaining filtering criteria for classifying electronic messages in a multi-tenant environment. In some embodiments, maintaining filtering criteria includes maintaining tenant-level filtering criteria for each of a plurality of tenants in a multi-tenant environment. For each tenant, maintaining tenant-level filtering criteria includes identifying one or more feedback signals from one or more users within the tenant regarding a messaging campaign. For each tenant, maintaining tenant-level filtering criteria also includes, when the messaging campaign has not yet been categorized, and when the one or more feedback signals indicate that the messaging campaign is undesirable to the tenant, updating the tenant-level filtering criteria for the tenant to signal the messaging campaign as undesirable for the tenant. For each tenant, maintaining tenant-level filtering criteria also includes, when the messaging campaign has previously been categorized as undesirable, and when the one or more feedback signals indicate that the messaging campaign is desirable to the tenant, updating the tenant-level filtering criteria for the tenant to signal the messaging campaign as desirable for the tenant.

Maintaining filtering criteria also includes calculating a reputation score for each of the plurality of tenants. Then, when a threshold number of tenants, which each have a threshold reputation score, reach a consensus regarding desirability of the messaging campaign, global filtering criteria is updated to signal desirability of the messaging campaign according to the consensus.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
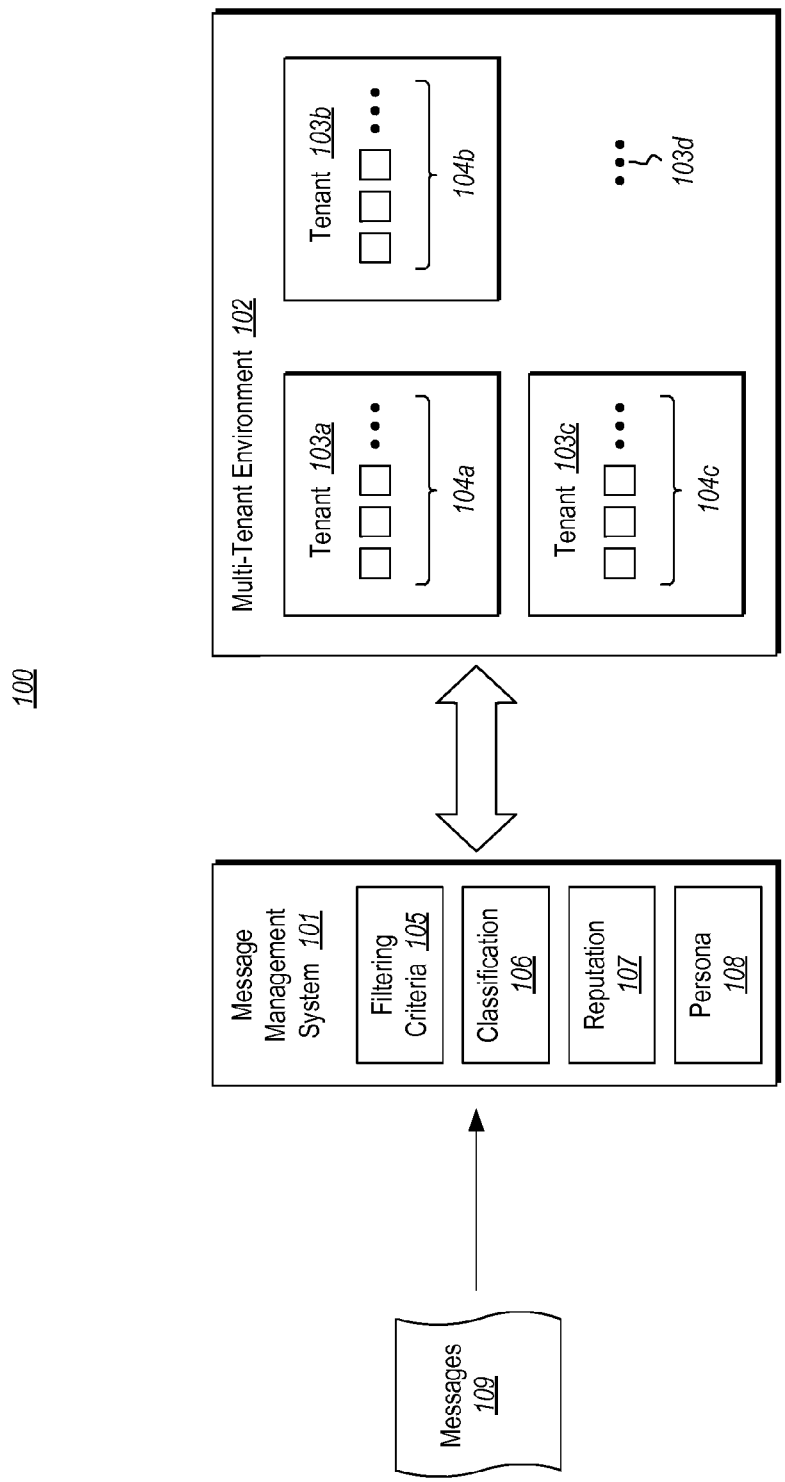
FIG. 1 illustrates an example computer architecture for providing tenant-level electronic message filtering.

At least some embodiments described herein are directed to maintaining filtering criteria for classifying electronic messages in a multi-tenant environment, including introducing tenant-level filtering criteria. In general, tenant-level filtering criteria may be updated based on user-level feedback from within the tenant, and global filtering criteria may be updated based on tenant-level filtering criteria from a plurality of tenants. The introduction of tenant-level filtering criteria provides for responsive and highly customized filtering for individual tenants, based on user feedback from within the tenant. In addition, updating global filtering criteria based on tenant-level filtering criteria from a plurality of tenants provides several unique mechanisms to isolate and/or identify spammers, and to prevent them from gaming global filtering criteria.

Embodiments may include methods, systems, and/or computer program products for maintaining filtering criteria for classifying electronic messages in a multi-tenant environment. In some embodiments, maintaining filtering criteria includes maintaining tenant-level filtering criteria for each of a plurality of tenants in a multi-tenant environment. For each tenant, maintaining tenant-level filtering criteria includes identifying one or more feedback signals from one or more users within the tenant regarding a messaging campaign. For each tenant, maintaining tenant-level filtering criteria also includes, when the messaging campaign has not yet been categorized, and when the one or more feedback signals indicate that the messaging campaign is undesirable to the tenant, updating the tenant-level filtering criteria for the tenant to signal the messaging campaign as undesirable for the tenant. For each tenant, maintaining tenant-level filtering criteria also includes, when the messaging campaign has previously been categorized as undesirable, and when the one or more feedback signals indicate that the messaging campaign is desirable to the tenant, updating the tenant-level filtering criteria for the tenant to signal the messaging campaign as desirable for the tenant.

Maintaining filtering criteria also includes calculating a reputation score for each of the plurality of tenants. Then, when a threshold number of tenants, which each have a threshold reputation score, reach a consensus regarding desirability of the messaging campaign, global filtering criteria is updated to signal desirability of the messaging campaign according to the consensus.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media, comprising one or more hardware storage devices. Computer-readable media that carry computer-executable instructions and/or data structures are transmission media. Thus, by way of example, and not limitation, embodiments of the invention can comprise at least two distinctly different kinds of computer-readable media: computer storage media (hardware storage devices) and transmission media.

Computer storage media are hardware devices that store computer-executable instructions and/or data structures. Physical storage media include computer hardware devices, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

FIG. 1 illustrates an example computer architecture 100 for providing tenant-level electronic message filtering. Referring to FIG. 1, computer architecture 100 includes a message management system 101 and a multi-tenant environment 102. The multi-tenant environment 102 can comprise any environment that provides services for a plurality of tenants. Thus, as depicted, the multi-tenant environment 102 includes a plurality of tenants (e.g., tenants 103a-103c, referred to herein collectively as tenants 103). Although three tenants 103 are depicted, the multi-tenant environment 102 can include any number of tenants 103 (i.e., one or more), as indicated by the ellipses 103d. A tenant 103 is an entity that uses services of the multi-tenant environment 102, and may include a user, a company, a department of a company, or any other entity that has rights to access resources of the multi-tenant environment 102. Although not required, each tenant 103 is typically associated with a plurality of users. Thus, in FIG. 1, each tenant 103 is depicted to include a plurality of boxes (i.e., 104a, 104b, and 104c), with each box representing a different user account within the tenant 103. Users and/or their accounts are refereed to collectively herein simply as users 104.

In some embodiments, the multi-tenant environment 102 may comprise a multi-tenant cloud-computing environment, in which the multi-tenant environment 102 services multiple tenants 103 (e.g., to provide one or more software applications or services), but logically partitions of the data and configuration for each tenant 103. Data for each tenant 103 is protected and separated, and the applications/services are configurable on a per-tenant basis. In some embodiments, resources of the multi-tenant environment 102 comprises one or more virtual machines that are deployed on each tenant's behalf.

As part of the software applications or services that are provided to the tenants 103, the multi-tenant environment 102 may provide electronic messaging services. As used herein, electronic messaging and electronic messages can refer to any form of electronic communication for which classification of messages as desirable or undesirable is possible. Examples of electronic messaging include e-mail, SMS, MMS, instant messaging, social networking messages, or even messaging formats that are application-specific and/or proprietary to the multi-tenant environment 102.

The message management system 101 provides message classification and filtering functionality. Although depicted as separate from the multi-tenant environment 102, this is done for ease in description only, and one of ordinary skill in the art will recognize that that message management system 101 may be fully or partially integrated into the multi-tenant environment 102, itself. For example, the message management system 101 may comprises a management system, component or service within the multi-tenant environment 102. Additionally or alternatively, the message management system 101 may be at least partially integrated into each tenant 103. For example, the message management system 101 may comprise a management system, component or service within the multi-tenant environment 102 that serves the tenants 103 generally, as well as one or more separate components that execute within each tenant 103 individually. In another example, functionality of the message management system 101 may by fully distributed as separate components within the tenants 103.

In general, the message management system 101 implements a variety functionality to classify individual electronic messages and/or messaging campaigns comprising a plurality of messages with respect to the tenants 103, in order to determine whether the messages should be delivered to the tenants 103 and/or their users 104. As used herein a "messaging campaign" refers to a plurality of related messages, such as messages sent by the same sender, messages with similar content, similar messages targeted to particular tenants 103 or users 104, etc. For ease in description, this functionality is depicted as a plurality of components (or modules), though one of ordinary skill in the art would recognize that the particular implementation of the functionality might vary. As such, the disclosure herein and the attached claims are not limited to the particular number and/or arrangement of the depicted components (or modules).

As depicted, the message management system 101 includes filtering criteria 105, a classification component 106, a reputation component 107, and a persona component 108. Using these components, the message management system 101 classifies incoming messages/messaging campaigns (depicted as messages 109), and allows/disallows their delivery to tenants 103 and/or their users 104 accordingly. Messages 109 represents any incoming information about messages or messaging campaigns, and may comprise individual messages, a plurality of messages that are part of a campaign, or merely metadata (e.g., envelope information, hashes, etc.) obtained from the message(s) or derived from the message(s). Although the messages 109 are depicted as arriving at message management system 101, one of ordinary skill in the art will recognize that the messages 109 may actually arrive elsewhere. For example, the tenants 103 may receive the messages 109 and communicate them to the message management system 101, the tenants 103 may receive the messages 109 and communicate metadata about them to the message management system 101, the tenants 103 may receive the messages 109 and operate on them using components of the message management system 101 that execute at the tenants 103, etc.

The filtering criteria 105 is usable for classifying the messages 109. As such, the filtering criteria 105 can include any rules and/or information for classifying messages, such as keywords, hashes, IP addresses, e-mail addresses, etc., and which information may be arranged into blacklists, whitelists, etc. The filtering criteria 105 includes a plurality of levels of filtering criteria, including tenant-level criteria, which feed into each other.

Figure 2:
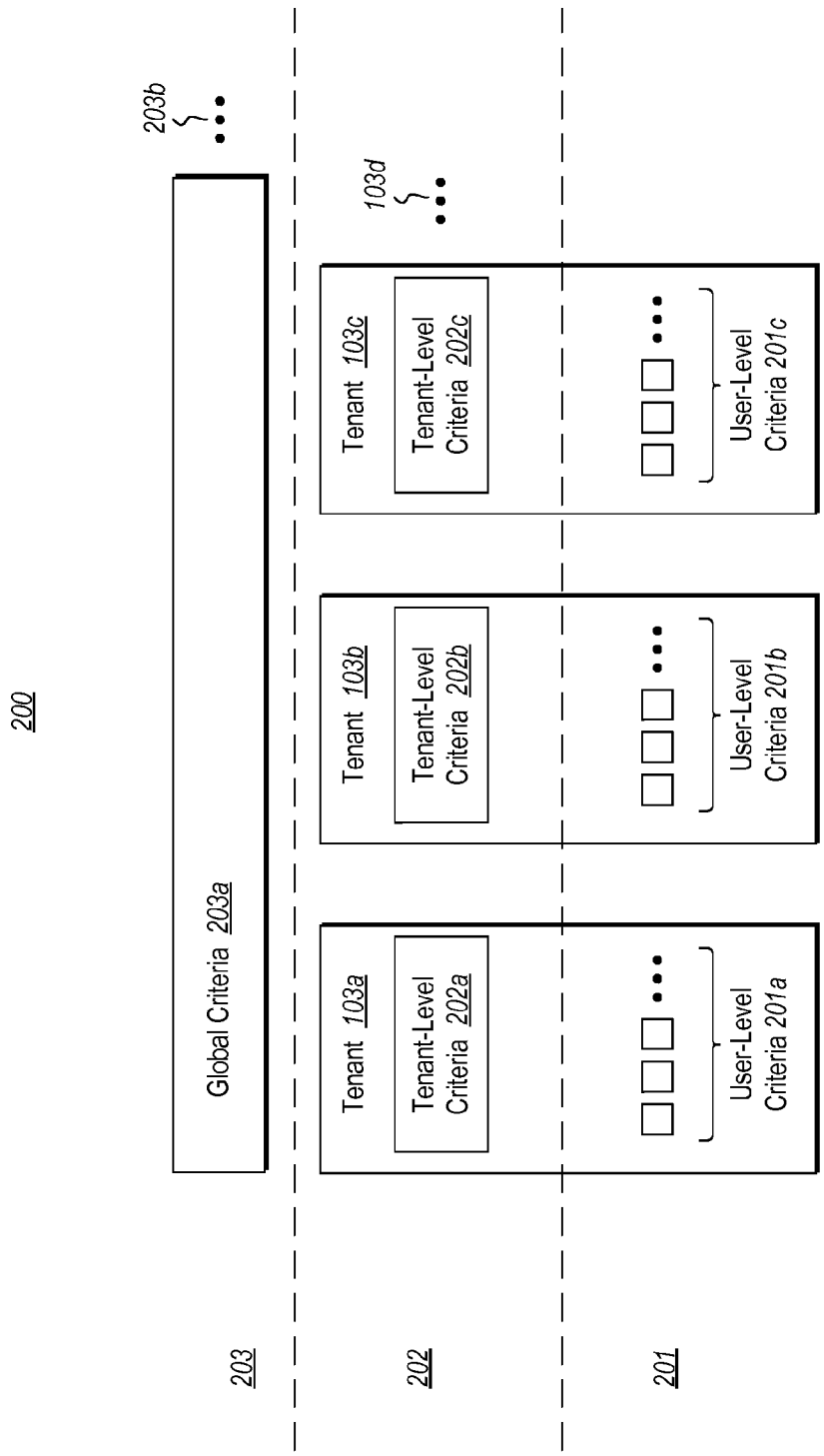
FIG. 2 illustrates an example hierarchy of filtering criteria.

For example, FIG. 2 illustrates an example hierarchy 200 of filtering criteria 105. In general, individual filtering criteria propagates from the bottom of the hierarchy 200 to the top of the hierarchy 200, although it is possible that some criteria could propagate from the top down or laterally. As depicted in FIG. 2, the filtering criteria 105 includes user-level criteria 201, tenant-level criteria 202, and global criteria 203.

The user-level criteria 201 (e.g., user-level criteria 201a for users 104a at tenant 103a; user-level criteria 201b for users 104b at tenant 103b; and user-level criteria 201c for users 104c at tenant 103c) is specific to individual users. Thus, each individual user 104 may have his or her own user-level criteria 201, which applies filtering rules for the user, and which is updated as the user signals a classification (e.g., desirable, undesirable) for messages or messaging campaigns received by the user.

The tenant-level criteria 202 (e.g., tenant-level criteria 202a for users 104a at tenant 103a; tenant-level criteria 202b for users 104b at tenant 103b; and tenant-level criteria 202c for users 104c at tenant 103c) is specific to individual tenants. Thus, each tenant 103 has its own tenant-level criteria 202, which applies filtering rules for the tenant, and which is updated as individual users within the tenant signal classifications (e.g., desirable, undesirable) for messages or messaging campaigns received within the tenant 103. For example, the tenant-level criteria 202 for a given tenant may be updated (to allow or disallow a messaging campaign) when users within the tenant have reached a consensus regarding the desirability of the messaging campaign.

The global criteria 203 (e.g., global criteria 203a, which is applied to tenants 103a, 103b, and 103c) applies to a plurality of tenants. Thus, each set of global criteria 203 applies filtering rules for the plurality of tenants to which the global criteria applies, and is updated as these tenants signal classifications (e.g., desirable, undesirable) for messages or messaging campaigns received by the tenants. For example, the global criteria 203 may be updated (to allow or disallow a messaging campaign) when the corresponding tenants have reached a consensus regarding the desirability of the messaging campaign.

As depicted by the ellipses 203b, there may be multiple sets of global criteria 203. As such, different tenants 103 may be associated with different global criteria 203, based on attributes of the tenants 103. For example, tenants 103 may be grouped together based on common geography (e.g., Americas, Europe, Asia, etc.), common industry (e.g., information technology, healthcare, finance, etc.), common technology (e.g., web technologies, hardware technologies, data analysis technologies), etc. Thus, different global criteria 203 may apply to different groupings of tenants 103, based on common attributes of the tenants 103.

As used herein, a consensus can comprise any measure indicating a sufficient agreement among a given set of entities (e.g., tenants 103 or users 104, depending on whether tenant-level criteria 202 or global criteria 203 is being updated). Examples of a consensus may comprise a threshold percentage of entities (whether or not that percentage indicates a majority), a threshold number of entities, etc. In addition, as discussed herein after, entities may be weighted differently (e.g., based on reputation, persona score, etc.) when considering whether to update filtering criteria with respect to a messaging campaign. As such, the measure of consensus may give some entities more or less weight than other entities when determining whether there is a consensus.

Incoming messages can be classified based on a combination of the different types of filtering criteria 105 (i.e., combinations of the user-level criteria 201, tenant-level criteria 202, and global criteria 203). For example, an incoming message 109 for a user may be blocked as undesirable if it is classified as undesirable in any one of the global criteria 203, the tenant-level criteria 202 for the user's tenant, or the user's own user-level criteria 201. In addition, one level of filtering criteria 105 may override another level of filtering criteria 105. Typically, a lower level of filtering criteria 105 overrides a higher level of filtering criteria 105. For example, if an incoming message 109 is classified as undesirable in the global criteria 203, the message may still be permitted to reach a user if its categorized as desirable in the tenant-level criteria 202 for the user's tenant or the user's own user-level criteria 201.

Returning to FIG. 1, the classification component 106 identifies desirability of a messaging campaign, based on signals from users and tenants, and updates the filtering criteria 105 accordingly. For example, at the user level 201, as individual users signal messages as desirable or undesirable, the classification component 106 updates each user's individual criteria accordingly. In addition, at the tenant level 202, based on feedback signals from users (e.g., users 104a) in each tenant (e.g., tenant 103a), the classification component 106 updates each tenant's own tenant-level criteria (e.g., tenant-level criteria 202a) when there is consensus among the users (e.g., users 104a). Finally, at the global level 203, based on feedback signals from a plurality of tenants (e.g., tenants 103), the classification component 106 updates the global criteria 203a when there is consensus among the tenants 103.

Updating filtering criteria (at any level) 105 can include adding rules/keywords that classify messages 109 as undesirable or desirable, removing rules/keywords that previously classified messages 109 as undesirable or desirable, modifying existing rules/keywords, adding or removing rules/keywords to override a higher-level classification, etc.

The classification component 106 can weight different users 104 or tenants 103 differently when updating the filtering criteria 105, including giving some users or tenants no weight whatsoever. As indicated previously, the message management system 101 can include a reputation component 107. The reputation component 107 can be configured to continuously or periodically calculate a reputation score for each of the tenants 103. A reputation score can be based on a variety of factors, such as the amount of time the tenant 103 has been a customer, the reliability of the tenant 103 when signaling prior messaging campaigns as desirable or undesirable (e.g., do their signals ultimately agree with other tenants?), the size of the tenant 103 (e.g., in terms of numbers of users, amount of data stored or processed by the tenant, the amount of business that has been conducted with the tenant, etc.), the technical merit of the tenant 103 (e.g., is the tenant one that operates in a technical or non-technical field), the amount of undesirable electronic messages that have been sent by the tenant 103 (e.g., are they a tenant that may be suspected as being a spammer, themselves?), etc. Based on reputation score, the classification component 106 can identify which tenants 103 to use when updating the global criteria 203 (e.g., only tenants with a reputation score above a predetermined or dynamically-computed threshold can affect the global criteria 203), and/or assign a weight to the tenants 103 (e.g., signals from tenants having a higher reputation score are weighted more heavily than those from tenants having a lower reputation score).

In addition, the message management system 101 can include a persona component 108. The persona component 108 can be configured to identify a persona for one or more users within tenants 103. For example, the persona component 108 may identify a users' role within an organization (e.g., system administrator, programmer, marketing, sales, leadership role, etc.). These personas may then be used by the classification component 106 when updating tenant-level rules 103. Personas may be identified based on configuration settings associated with user accounts, content of a users' communications, etc. Privacy and anonymity may be maintained when identifying personas through use of hashes or random identifiers.

It will be appreciated that there is a great variety of manners in which personas may be used to update tenant-level rules 202. As one example, users who are generally technical (e.g., system administrators, engineers, programmers, etc.) may be better able to correctly identify whether electronic message contain malware, phishing attacks, etc. than other types of users. As such, the classification component 106 may weight message signals from administrators and other technical users more heavily than message signals from other types of users, since signals from administrators and other technical users may generally be more reliable.

In another example, users having one organizational role may have different views on which messages are desirable than users having another organization role. For example, marketing users may prefer to receive social media-related messages that other types of users may consider undesirable. As such, the classification component 106 may weight message signals from marketing users less heavily than message signals from other types of users, since these signals may generally be in disagreement with the majority of users at the tenant. Additionally or alternatively, the classification component 106 create tenant-level rules that permit certain types of campaigns to reach marketing users, but prevent those messages from reaching other types of users.

In yet another example, users having one organizational role may be more likely to receive undesirable messaging campaigns than other types of users, and may thus report undesirable messages more frequently. For example, sales users may receive a greater quantity of undesirable messages than other types of users, since they frequently give out their contact information. As such, the classification component 106 may provide additional weight to message signals from sales users, since they are more likely to receive and report undesirable messages than other users.

In addition, the classification component 106 can also update tenant-level rules 202 based on express user input. For example, a system administrator within a tenant may provide user input that expressly overrides, adds, removes, or modifies tenant-level rules 202.

In general, the addition of tenant-level criteria 202 can increase the speed with which signals for messaging campaigns can propagate from the user level 201 for the benefit of a plurality of users, as compared to systems having only user and global rules. A mentioned before, in classic systems it may also take an unacceptably long amount of time update the global criteria to allow or disallow a messaging campaign, since it may take some time for users to reach consensus regarding desirability of the campaign—particularly if the system has a great number and/or great diversity of users. However, with the introduction of tenant-level criteria 202, the tenant-level criteria 202 for a given tenant may be updated quickly relative to global rules 203, since it is likely that the users 104 of the tenant 103 will reach a consensus regarding desirability of a campaign more quickly than all users of the system generally. This is particularly true if messaging campaigns are being are targeted to users of particular tenants.

Furthermore, tenant-level criteria 202 can operate to isolate tenants 103. Since tenant-level criteria 202 are specific to each tenant, and since the tenant-level criteria 202 is only directly affected by users within the tenant, a given tenant is insulated from the message signals given by users of another tenant. Tenant isolation also enables extensive and flexible tenant-level filter customization. For example, users of one type of tenant (e.g., a marketing company) may have a different view on what are desirable vs. undesirable messages than users of another type of tenant (e.g., an information technology company). As such, each tenant can develop filtering criteria that are tailored to their own users.

Additionally, since the global criteria 203 is updated based on agreement among the tenants 103 (instead of users generally), a single tenant (e.g., a tenant that is a spammer) is unlikely to adversely affect the global criteria 203. This is particularly the case where the tenant is given a low reputation score (e.g., for providing unreliable message signals, for sending outgoing messages that are undesirable, etc.), since that tenant may be given a low weight, or may not even be considered, when updating the global criteria 203. Thus, the addition of tenant-level criteria 202 can make it difficult for spammers to game the global criteria 203, even if the spammer were to obtain a tenant account in the multi-tenant environment 102.

In view of the foregoing, embodiments are now described in the context of methods comprising methodological acts. These methods will be described with respect to the computer architecture 100 of FIG. 1 and the hierarchy 200 of filtering criteria illustrated in FIG. 2. While, for ease in description, the methodological acts are depicted in flow charts having an ordering, it will appreciated that the order of the methodological acts are not limited to the ordering that is depicted.

Figure 3:
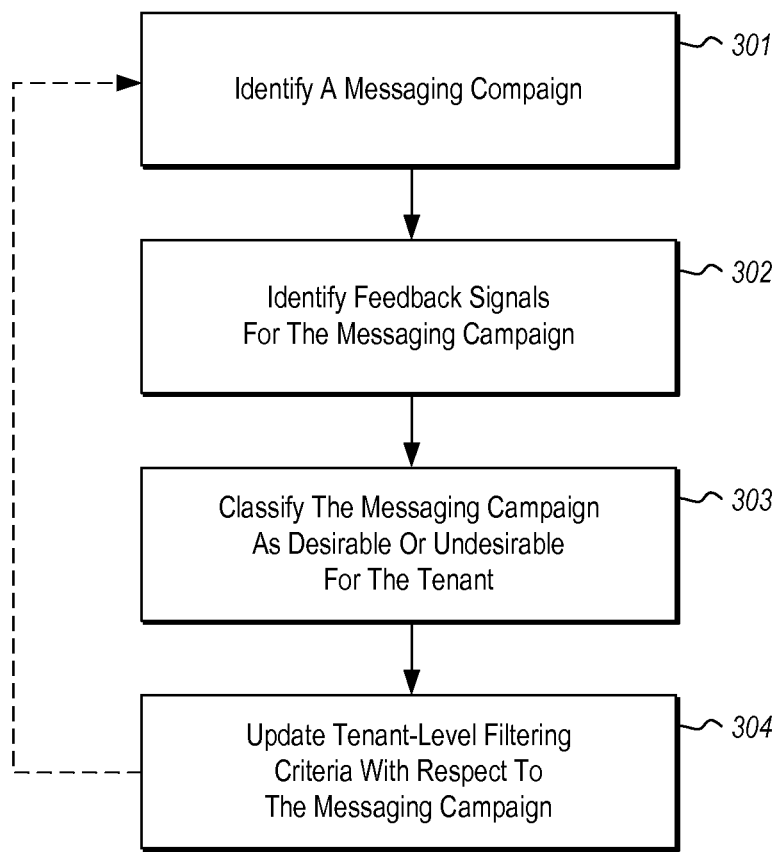
FIG. 3 illustrates a flow chart of an example method for updating tenant-level filtering criteria.

FIG. 3 illustrates a flow chart of an example method 300 for updating tenant-level filtering criteria. For example, the message management system 101 may maintain filtering criteria 102, including tenant-level filtering criteria 202 for each of a plurality of tenants 103 in a multi-tenant environment 102. Method 300 can operate at each of the tenants 103, to update tenant-level filtering criteria for each tenant.

For each tenant (e.g., each of tenants 103*a*, 103*b*, 103*c*, and others (i.e., 103*d*)), method 300 comprises an act 301 of identifying a messaging campaign. Act 301 can include identifying the messaging campaign from one or more electronic messages received at the tenant. For example, at tenant 103*a*, the classification component 106 can identify one or more messages of a messaging campaign targeted at the users 104*a* of the tenant 103*a*. A messaging campaign would typically include a plurality of related messages, such as messages related by content, sender, etc., which are received at the tenant 103*a*.

Method 300 also comprises an act 302 of identifying feedback signals for the messaging campaign. Act 302 can include identifying one or more feedback signals from one or more users within the tenant regarding a messaging campaign. For example, the classification component 106 can identify feedback signals (e.g., undesirable/desirable) from one or more of the users 104*a* in tenant 103*a* regarding messages in the messaging campaign. The feedback signals may originate from user-level criteria 201*a* from users at the tenant 103*a*.

An 'undesirable' feedback signal may be one in which the user expressly reports the message as SPAM, junk, malware, phishing, etc., in which the user moves the message to a junk folder, in which the user deletes the message without opening it, in which a reply from the user includes terms such as 'unsubscribe' or 'remove', in which the user sets up a rule that automatically deletes similar messages, etc. A 'desirable' feedback signal may be one in which the user expressly reports the message as not SPAM or no junk, in which the user removes the message from a junk folder, in which the user moves the message into a general folder, in which the user reads and replies to the message, etc.

Method 300 also comprises an act 303 of classifying the messaging campaign as desirable or undesirable for the tenant. For example, the classification component 106 can identify feedback signals from the users 104*a* in the tenant 103*a*, and identify a consensus (e.g., desirable/undesirable) regarding the messaging campaign. As discussed previously, consensus may be based on thresholds (e.g., a number of users, a percentage of users), and may be based on identifying a persona of one or more of the users and weighting different users differently based on persona. As such, act 303 may include the classification component 106 assigning a persona to a user within the tenant 103*a*, and weighting a feedback signal from the user based on the assigned persona. Assigning the persona may include identifying a role of the user within an organization. Additionally or alternatively, consensus may be based on a calculated reputation score for one or more of the users.

Method 300 also comprises an act 304 of updating tenant-level filtering criteria for the tenant with respect to the messaging campaign. For example, the classification module 106 can update the tenant-level criteria 202*a* for the tenant 103*a* with respect to the messaging campaign. Updating the tenant-level criteria 202*a* can include a great variety of updates, including adding/removing rules and/or keywords, modifying rules and/or keywords, overriding rules and/or keywords (at the tenant level or the global level, etc.).

Figure 4A:
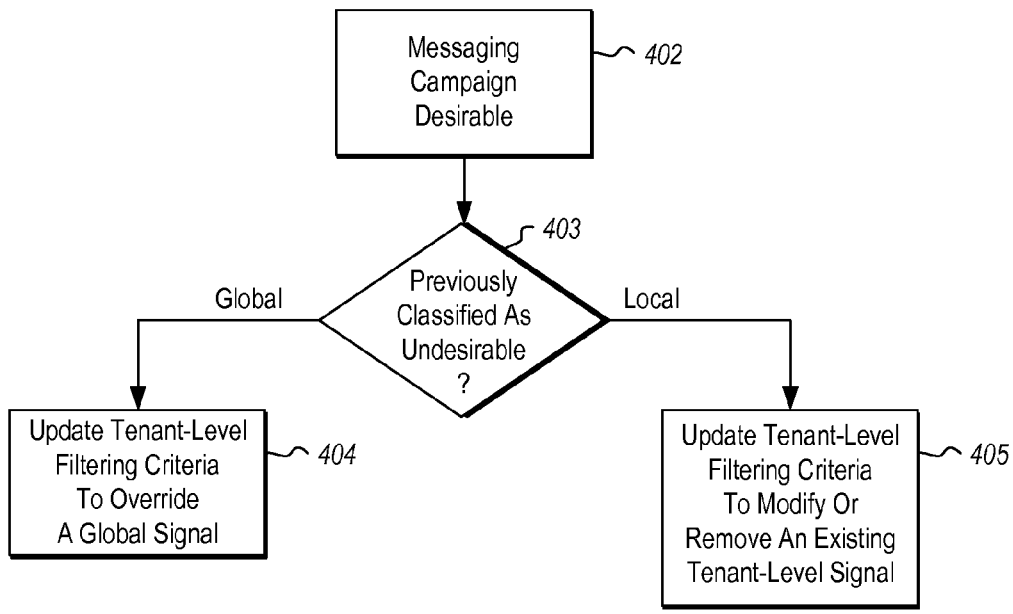
FIG. 4A illustrates an example flowchart for classifying a messaging campaign, which was previously classified as undesirable, as desirable.

One example of updating tenant-level filtering criteria for the tenant with respect to the messaging campaign may include updating the tenant-level filtering criteria to signal the messaging campaign as desirable for the tenant when the messaging campaign has previously been categorized as undesirable and when the one or more feedback signals indicate that the messaging campaign is desirable to the tenant. For example, FIG. 4A illustrates an example flowchart 400 for classifying a messaging campaign, which was previously classified as undesirable, as desirable. As depicted, at 402 a messaging campaign is classified as desirable (e.g., by classification component 106 in act 303 based on signals from users 104*a* in tenant 103*a*). Then, at 403 it is determined where the messaging campaign was previously classified as undesirable. For example, the messaging campaign may have been signaled as undesirable globally in the global criteria 203*a* or locally in the tenant's tenant-level criteria 202*a*. When the messaging campaign was signaled as undesirable in the global criteria 203*a*, the tenant-level criteria 202*a* is updated to override the global signal. When the messaging campaign was signaled as undesirable locally in the tenant-level criteria 202*a*, the tenant-level criteria 202*a* is updated to modify or remove and existing tenant-level signal.

Figure 4B:
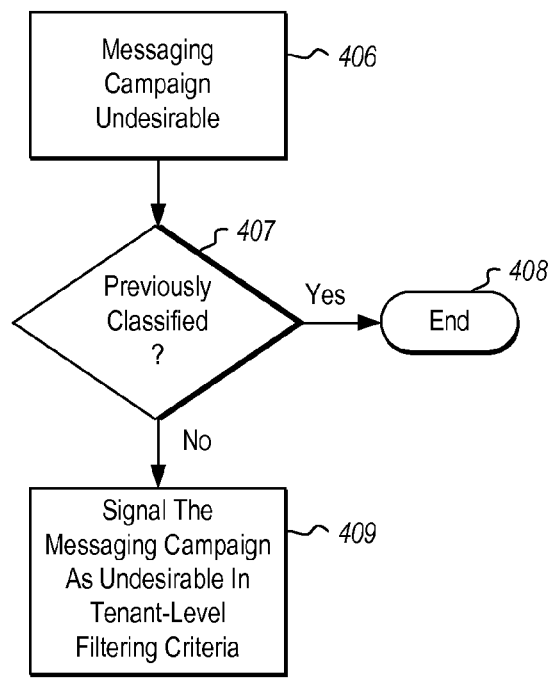
FIG. 4B illustrates an example flowchart for classifying a messaging campaign as undesirable.

Another example of updating tenant-level filtering criteria for the tenant with respect to the messaging campaign may include updating the tenant-level filtering criteria to signal the messaging campaign as undesirable for the tenant when the messaging campaign has not yet been categorized and when the one or more feedback signals indicate that the messaging campaign is undesirable to the tenant. For example, FIG. 4B illustrates an example flowchart 401 for classifying a messaging campaign as undesirable. As depicted, at 406 a messaging campaign is classified as undesirable (e.g., by classification component 106 in act 303 based on signals from users 104*a* in tenant 103*a*). Then, at 407 it is determined where the messaging campaign was previously classified as undesirable in the tenant-level criteria 202*a*. If so, then the flowchart ends at 408. If not, then at 409 the messaging campaign is signaled as undesirable in the tenant-level criteria 202*a*.

In some embodiments, method 300 includes use of an override signal by an administrative user. For example an administrative user may override a rule that is added to the tenant-level criteria. As such, method 300 may include receiving an override signal from an administrative user in the tenant 103*a* with respect to the messaging campaign, and updating the tenant-level criteria 202*a* for the tenant 103*a* to signal the messaging campaign according to the override signal received from the administrative user.

As depicted by the dashed arrow, the method 300 may be periodically or continuously repeated on the same messaging campaign and/or on different messaging campaigns.

Figure 5:
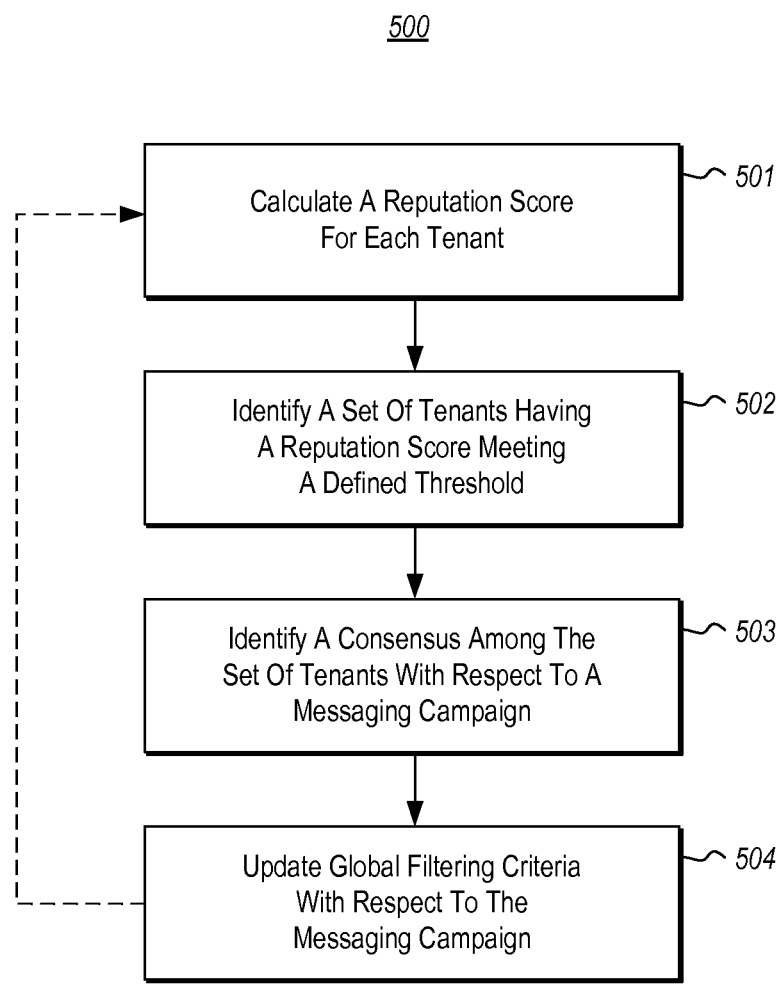
FIG. 5 illustrates a flow chart of an example method for updating global-level filtering criteria based on tenant-level filtering criteria.

In addition to the foregoing, FIG. 5 illustrates a flow chart of an example method 500 for updating global-level filtering criteria based on tenant-level filtering criteria. For example, method 500 may operate to update the global-level criteria 203 based on applicable tenants. In some embodiments, the global-level criteria 203 applies to all tenants in a multi-tenant environment. However, in some embodiments, there may be different global-level criteria 203 for different groups of tenants, such as the global-level criteria 203a that applies to tenants 103a-103d. These tenants may be categorized together based on a having common attribute (e.g., geography, area of industry, technology, etc.), such that the global criteria 203a comprises applies to tenants having the common attribute.

Method 500 comprises an act 501 of calculating a reputation score for each tenant. Act 501 can include the reputation component 107 calculating a reputation score for tenants 103a, 103b, 103c, and others (i.e., 103d) in the multi-tenant environment 102. Calculating the reputation scores for a tenant can be based on a temporal duration for which the tenant has been a tenant, a reliability of the tenant when signaling prior messaging campaigns as desirable or undesirable, a size of the tenant, (iv) a technical merit of the tenant, an amount of undesirable electronic messages that have been sent by the tenant, etc.

Method 500 also comprises an act 502 of identifying a set of tenants having a reputation score meeting a defined threshold. For example, the classification component 106 may identify that only tenants 103a, 103b, and 103c have a reputation score meeting a defined threshold. As such, only tenants 103a, 103b, and 103c (and not tenants 103d) will be considered when updating the global criteria 203a.

Method 500 also comprises an act 503 of identifying a consensus among the set of tenants with respect to a messaging campaign. For example, each of tenants 103a, 103b, and 103c may signal a particular messaging campaign as desirable or undesirable in their tenant-level criteria 202a, 202b, and 202c (e.g., as per method 300). The classification component 106 can thus determine a consensus regarding desirability of the messaging campaign that has been reached among these tenants. As discussed previously, when determining consensus, the classification component 106 can weight different tenants differently based, for example, on their reputation score.

Method 500 also comprises an act 504 of updating global filtering criteria with respect to the messaging campaign. For example, the classification component 106 can update the global criteria 203a to signal desirability of the messaging campaign (e.g., as desirable or undesirable) according to the consensus determined in act 503.

Thus, embodiments herein introduce tenant-level filtering criteria for classifying electronic messages in a multi-tenant environment. Embodiments include updating tenant-level filtering criteria based on user-level feedback from within a tenant, and updating global filtering criteria based on tenant-level filtering criteria from a plurality of tenants.

Tenant-level filtering criteria provides for responsive and highly customized filtering for individual tenants, based on user feedback from within the tenant, while isolating tenants from each other. In addition, updating global filtering criteria based on tenant-level filtering criteria prevents spammers from gaming global filtering criteria.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
one or more processors; and
one or more hardware storage devices having stored thereon computer-executable instructions that are executable by the one or more processors and that configure the computer system to responsively filter electronic messages of a messaging campaign in a multi-tenant environment, including computer-executable instructions that configure the computer system to perform at least the following:
maintain tenant-level filtering criteria for each of a plurality of tenants in a multi-tenant environment including, for each tenant:
identifying one or more feedback signals from one or more users within the tenant regarding a messaging campaign; and
updating tenant-level filtering criteria for the tenant with respect to the messaging campaign, including:
when the messaging campaign has not yet been categorized, and when the one or more feedback signals indicate that the messaging campaign is undesirable to the tenant, updating the tenant-level filtering criteria to signal the messaging campaign as undesirable for the tenant; or
when the messaging campaign has previously been categorized as undesirable, and when the one or more feedback signals indicate that the messaging campaign is desirable to the tenant, updating the tenant-level filtering criteria to signal the messaging campaign as desirable for the tenant;
calculate a reputation score for each of the plurality of tenants;
based on a threshold number of tenants, which each have a threshold reputation score, reaching a consensus that the messaging campaign is undesirable, update global filtering criteria to signal the messaging campaign as being undesirable according to the consensus; and
based on updating the global filtering criteria to signal the messaging campaign as being undesirable according to the consensus, filter a particular electronic message that is identified as being part of the messaging campaign, including blocking the particular electronic message from being delivered to a computer system associated with at least one tenant.

2. The computer system as recited in claim 1, wherein the messaging campaign is identified from one or more electronic messages received at the tenant.

3. The computer system as recited in claim 1, wherein, for at least one tenant of the plurality of tenants, the messaging campaign was previously categorized as undesirable based on the global filtering criteria.

4. The computer system as recited in claim 1, wherein, for at least one tenant of the plurality of tenants, the messaging campaign was previously categorized as undesirable based on the tenant-level filtering criteria for the at least one tenant.

5. The computer system as recited in claim 1, also including computer-executable instructions that configure the computer system to calculate the reputation score for at least one of the plurality of tenants based on one or more of the group comprising: (i) a temporal duration for which the at least one tenant has been a tenant, (ii) a reliability of the at least one tenant when signaling prior messaging campaigns as desirable or undesirable, (iii) a size of the at least one tenant, (iv) a technical merit of the at least one tenant, and (v) an amount of undesirable electronic messages that have been sent by the at least one tenant.

6. The computer system as recited in claim 1, wherein the plurality of tenants are categorized together based on a having common attribute, and wherein the global filtering criteria comprises global filtering criteria for tenants having the common attribute.

7. The computer system as recited in claim 1, also including computer-executable instructions that configure the computer system to:
maintain user-level filtering criteria for users within the plurality of tenants.

8. The computer system as recited in claim 1, also including computer-executable instructions that configure the computer system to:
assign a persona to at least one user within at least one of the plurality of tenants; and
weight a feedback signal from the at least one user based on the assigned persona.

9. The computer system as recited in claim 8, also including computer-executable instructions that configure the computer system to:
identify a role of the at least one user within an organization when assigning the persona to the at least one user.

10. The computer system as recited in claim 1, also including computer-executable instructions that configure the computer system to:
receive an override signal from an administrative user of one of the plurality of tenants with respect to the messaging campaign; and
update the tenant-level filtering criteria for the one of the plurality of tenants to signal the messaging campaign according to the override signal received from the administrative user.

11. A method, implemented at a computer system that includes one or more processors, for responsively filtering electronic messages of a messaging campaign in a multi-tenant environment, the method comprising:
maintaining tenant-level filtering criteria for each of a plurality of tenants in a multi-tenant environment including, for each tenant:
identifying one or more feedback signals from one or more users within the tenant regarding a messaging campaign; and
updating tenant-level filtering criteria for the tenant with respect to the messaging campaign, including:
when the messaging campaign has not yet been categorized, and when the one or more feedback signals indicate that the messaging campaign is undesirable to the tenant, updating the tenant-level filtering criteria for the tenant to signal the messaging campaign as undesirable for the tenant; or
when the messaging campaign has previously been categorized as undesirable, and when the one or more feedback signals indicate that the messaging campaign is desirable to the tenant, updating the tenant-level filtering criteria for the tenant to signal the messaging campaign as desirable for the tenant;
calculating a reputation score for each of the plurality of tenants;

based on a threshold number of tenants, which each have a threshold reputation score, reaching a consensus that the messaging campaign is undesirable, updating global filtering criteria to signal the messaging campaign as being undesirable according to the consensus; and
based on updating the global filtering criteria to signal the messaging campaign as being undesirable according to the consensus, filtering a particular electronic message that is identified as being part of the messaging campaign, including blocking the particular electronic message from being delivered to a computer system associated with at least one tenant.

12. The method as recited in claim 11, wherein the messaging campaign is identified from one or more electronic messages received at the tenant.

13. The method as recited in claim 11, wherein, for at least one tenant of the plurality of tenants, the messaging campaign was previously categorized as undesirable based on the global filtering criteria.

14. The method as recited in claim 11, wherein, for at least one tenant of the plurality of tenants, the messaging campaign was previously categorized as undesirable based on the tenant-level filtering criteria for the at least one tenant.

15. The method as recited in claim 11, wherein calculating the reputation score for at least one of the plurality of tenants is based on one or more of the group comprising: (i) a temporal duration for which the at least one tenant has been a tenant, (ii) a reliability of the at least one tenant when signaling prior messaging campaigns as desirable or undesirable, (iii) a size of the at least one tenant, (iv) a technical merit of the at least one tenant, and (v) an amount of undesirable electronic messages that have been sent by the at least one tenant.

16. The method as recited in claim 11, wherein the plurality of tenants are categorized together based on having a common attribute, and wherein the global filtering criteria comprises global filtering criteria for tenants having the common attribute.

17. The method as recited in claim 11, further comprising:
maintaining user-level filtering criteria for users within the plurality of tenants.

18. The method as recited in claim 11, further comprising:
assigning a persona to at least one user within at least one of the plurality of tenants; and
weighting a feedback signal for the at least one user based on the assigned persona.

19. The method as recited in claim 11, further comprising:
receiving an override signal from an administrative user of one of the plurality of tenants with respect to the messaging campaign; and
updating the tenant-level filtering criteria for the one of the plurality of tenants to signal the messaging campaign according to the override signal received from the administrative user.

20. A computer program product comprising one or more hardware storage devices having stored thereon computer-executable instructions that structured to be executable by one or more processors of a computer system and to configure the computer system to responsively filter electronic messages of a messaging campaign in a multi-tenant environment, including computer-executable instructions that configure the computer system to perform at least the following:
maintain tenant-level filtering criteria for each of a plurality of tenants in a multi-tenant environment including, for each tenant:

identifying one or more feedback signals from one or more users within the tenant regarding a messaging campaign; and updating tenant-level filtering criteria for the tenant with respect to the messaging campaign, including:
when the messaging campaign has not yet been categorized, and when the one or more feedback signals indicate that the messaging campaign is undesirable to the tenant, updating the tenant-level filtering criteria for the tenant to signal the messaging campaign as undesirable for the tenant; or
when the messaging campaign has previously been categorized as undesirable, and when the one or more feedback signals indicate that the messaging campaign is desirable to the tenant, updating the tenant-level filtering criteria for the tenant to signal the messaging campaign as desirable for the tenant;

calculate a reputation score for each of the plurality of tenants;

based on a threshold number of tenants, which each have a threshold reputation score, reaching a consensus that the messaging campaign is undesirable, update global filtering criteria to signal the messaging campaign as being undesirable according to the consensus; and based on updating the global filtering criteria to signal the messaging campaign as being undesirable according to the consensus, filter a particular electronic message that is identified as being part of the messaging campaign, including blocking the particular electronic message from being delivered to a computer system associated with at least one tenant.

* * * * *